US012754073B2

(12) United States Patent
Le Noc et al.

(10) Patent No.: US 12,754,073 B2
(45) Date of Patent: Oct. 6, 2026

(54) METHOD FOR ESTIMATING THE TEMPERATURE AND THE OXIDE THICKNESS OF A STEEL STRIP

(71) Applicant: ArcelorMittal, Luxembourg (LU)

(72) Inventors: Gwenaël Le Noc, Ars-sur-Moselle (FR); Morgan Ferte, Jury (FR)

(73) Assignee: ArcelorMittal, Luxembourg (LU)

( * ) Notice: Subject to any disclaimer, the term of this patent is extended or adjusted under 35 U.S.C. 154(b) by 471 days.

(21) Appl. No.: 18/031,217

(22) PCT Filed: Oct. 15, 2021

(86) PCT No.: PCT/IB2021/059501
§ 371 (c)(1),
(2) Date: Apr. 11, 2023

(87) PCT Pub. No.: WO2022/079680
PCT Pub. Date: Apr. 21, 2022

(65) Prior Publication Data

US 2023/0375412 A1 Nov. 23, 2023

(30) Foreign Application Priority Data

Oct. 16, 2020 (WO) .................. PCT/IB2020/059760

(51) Int. Cl.
*G01J 5/00* (2022.01)
*G01B 21/08* (2006.01)
(Continued)

(52) U.S. Cl.
CPC ............ *G01J 5/0022* (2013.01); *G01B 21/08* (2013.01); *G01J 5/026* (2013.01); *G01J 5/602* (2013.01); *G01J 5/802* (2022.01)

(58) Field of Classification Search
CPC .......... G01J 5/0022; G01J 5/026; G01J 5/602; G01J 5/802; G01J 2005/0029; G01B 21/08
(Continued)

(56) References Cited

U.S. PATENT DOCUMENTS 5,481,112 A 1/1996 Marui et al.
5,690,430 A * 11/1997 Rudolph .................. G01J 5/60 250/341.7

FOREIGN PATENT DOCUMENTS

CN 111238663 A 6/2020
CN 111678478 A 9/2020
(Continued)

OTHER PUBLICATIONS

Search Report of PCT/IB2021/059501 of Jul. 12, 2021 and International Report on Patentability.

*Primary Examiner* — Aditya S Bhat
(74) *Attorney, Agent, or Firm* — Davidson Kappel LLC

(57) ABSTRACT

The present invention provides a method for estimating anoxide thickness and temperature of a heated steel strip undergoing a heat treatment performed at a temperature from 100° C. to 1100° C.. The method includes measuring at least two radiation intensities at different wavelengths, in a range from 1 to 5 µm, emitted by the heated steel strip estimating the temperature of the heated steel strip based on the at least two measured radiation intensities and a reference radiation intensity for at least a reference wavelength, estimating an emissivity of the heated steel strip, and estimating the oxide thickness, of the heated steel strip using the estimated emissivity.

12 Claims, 3 Drawing Sheets

(51) Int. Cl.
*G01J 5/02* (2022.01)
*G01J 5/60* (2006.01)
*G01J 5/80* (2022.01)

(58) Field of Classification Search
USPC .......................................................... 702/135
See application file for complete search history.

(56) References Cited

FOREIGN PATENT DOCUMENTS

| | | | |
|---|---|---|---|
| JP | H03293504 | A | 12/1991 |
| JP | H0440329 | A | 2/1992 |
| JP | H05164619 | A | 6/1993 |
| JP | H0682044 | B2 | 10/1994 |
| JP | H07270130 | A | 10/1995 |
| JP | H0933464 | A | 2/1997 |
| JP | H11325839 | | 11/1999 |
| JP | 2007010464 | A | 1/2007 |
| JP | 2007292498 | A | 11/2007 |
| JP | 2011202968 | A | 10/2011 |
| JP | 2020008484 | A | 1/2020 |
| KR | 20000042067 | A | 7/2000 |
| SU | 1296612 | A1 | 3/1987 |
| UA | 86871 | C2 | 5/2009 |

* cited by examiner

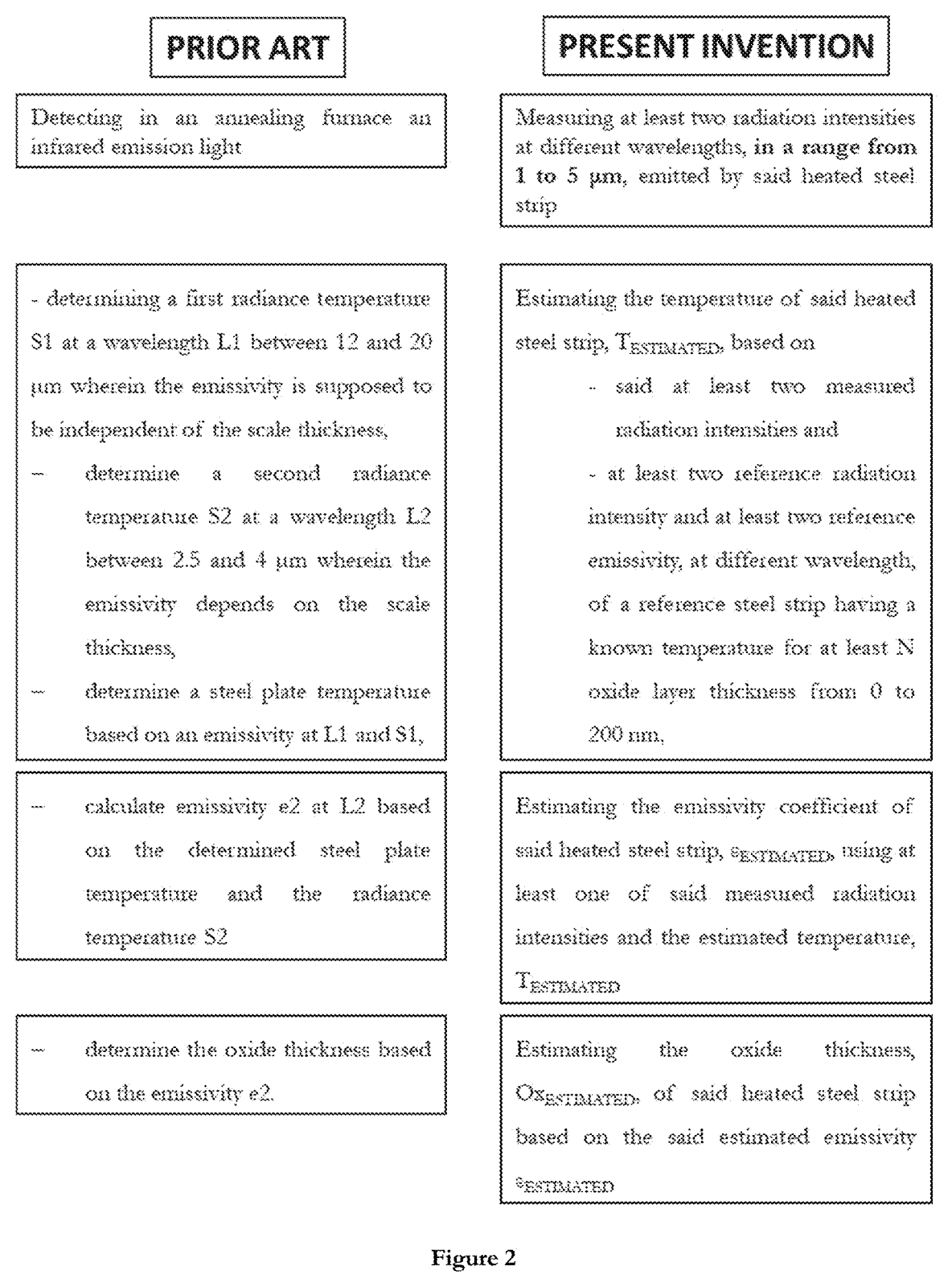

PRIOR ART

Detecting in an annealing furnace an infrared emission light

- determining a first radiance temperature S1 at a wavelength L1 between 12 and 20 µm wherein the emissivity is supposed to be independent of the scale thickness,
- determine a second radiance temperature S2 at a wavelength L2 between 2.5 and 4 µm wherein the emissivity depends on the scale thickness,
- determine a steel plate temperature based on an emissivity at L1 and S1,

- calculate emissivity e2 at L2 based on the determined steel plate temperature and the radiance temperature S2

- determine the oxide thickness based on the emissivity e2.

PRESENT INVENTION

Measuring at least two radiation intensities at different wavelengths, in a range from 1 to 5 µm, emitted by said heated steel strip Estimating the temperature of said heated steel strip, $T_{ESTIMATED}$, based on

- said at least two measured radiation intensities and
- at least two reference radiation intensity and at least two reference emissivity, at different wavelength, of a reference steel strip having a known temperature for at least N oxide layer thickness from 0 to 200 nm, Estimating the emissivity coefficient of said heated steel strip, $e_{ESTIMATED}$, using at least one of said measured radiation intensities and the estimated temperature, $T_{ESTIMATED}$ Estimating the oxide thickness, $Ox_{ESTIMATED}$, of said heated steel strip based on the said estimated emissivity $e_{ESTIMATED}$

Figure 2

METHOD FOR ESTIMATING THE TEMPERATURE AND THE OXIDE THICKNESS OF A STEEL STRIP

CROSS-REFERENCE TO RELATED APPLICATIONS

This application is the U.S. National Phase of PCT Appl. No. PCT/IB2021/059501 filed Oct. 15, 2021, which claims priority to IB2020059760W, filed Oct. 16, 2020, the entire disclosures of which are incorporated by reference herein.

TECHNICAL FIELD

The present invention relates to a method permitting to estimate the temperature and the oxide layer thickness of a steel strip.

BACKGROUND OF THE INVENTION

Steel strips undergo several thermal treatments in order to enhance their properties. In most of those treatments, the steel strip is heated above a determined temperature and then cooled more or less rapidly.

One of the most common thermal treatments is annealing which permits an increase in the ductility of the steel strip and a reduction in its hardness. In this process, the strip is heated and maintained above its recrystallization temperature and then cooled. During the annealing, the strip surface is gradually oxidized and a layer of oxide is generally formed on its surface. However, depending on several factors (such as the annealing condition: e.g. temperature, dew point, atmosphere, and the steel grade), the oxide layer thickness varies from 0 to 200 nm. Generally, the oxide layer is essentially composed of FeO due to the thermo-dynamical conditions.

Controlling the strip temperature and the oxide layer thickness is key to ensure a good quality of the strip, control the process and adapt the subsequent process steps. In an annealing furnace, this control is usually done by means of pyrometers using the strip radiation to measure the temperature.

SUMMARY OF THE INVENTION

Yet, the thickness variation of the oxide layer impacts the temperature measurement done by the pyrometers. Indeed, the thicker the oxide layer, the greater the emissivity and so the greater the intensity of the detected signal by the pyrometers. However, an increase of the steel temperature also leads to a greater detected signal. Consequently, a pyrometer cannot reliably detect the presence of an oxide layer, let alone its thickness. When the detected signal intensity increases, it is not possible to determine if it is due to an increase of the temperature, of the oxide layer thickness or of both.

Thus, the measured temperature by a pyrometer is not reliable because it does not take into consideration the emissivity variation due to the oxide layer thickness variation. Therefore, a coefficient, depending on the emissivity of the measured layer, is applied to the temperature given by the pyrometers. Several methods have been developed to estimate the temperature and the emissivity of a steel strip during an annealing.

JP 09 033 464 discloses a method to measure online the scale thickness. It claims a six-steps process comprising the steps of:

- detecting in an annealing furnace an infrared emission light,
- determining a first radiance temperature S1 at a wavelength L1 between 12 and 20 μm wherein the emissivity is supposed to be independent of the scale thickness,
- determine a second radiance temperature S2 at a wavelength L2 between 2.5 and 4 μm wherein the emissivity depends on the scale thickness,
- determine a steel plate temperature based on an emissivity at L1 and S1,
- calculate emissivity e2 at L2 based on the determined steel plate temperature and the radiance temperature S2,
- determine the oxide thickness based on the emissivity e2.

The reliability of this measure is limited because even though the emissivity is nearly constant in the 12 to 20 μm domain, its variation in percentage is not negligible and can lead to temperature measurement error of more than 50° C. Moreover, the emissivity in this wavelength domain is particularly influenced by parasite flow in industrial condition which lower the temperature reliability.

JP 11 325 839 discloses a method to precisely measure the thickness of an oxide film formed on a steel plate. The method comprises two steps:

- assume that the steel temperature is equal to the soaking temperature of the steel,
- measuring the radiance from the surface of a steel sheet at a plurality of wavelength between 2.5 and 10 μm,
- determining the oxide film thickness based on the relationship between the radiance, the oxide film thickness and the emissivity.

The reliability of this measure is limited because industrially, aimed soaking temperature can be different soaking temperature in the furnace. Moreover, there might be a temperature discrepancy between the soaking temperature and the one of the steel during the radiance measurement.

Consequently, it is necessary to develop a method permitting to accurately and reliably determine the temperature of the steel strip in order to increase the reliability and the precision of the measurement of its oxide layer thickness.

The present invention provides a method for estimating the oxide thickness and the temperature of a heated steel strip, undergoing a heat treatment performed at a temperature from 100° C. to 1100° C., comprising the steps of:

- Measuring at least two radiation intensities at different wavelengths, in a range from 1 to 5 μm, emitted by said heated steel strip,
- Estimating the temperature of said heated steel strip, $T_{ESTIMATED}$, based on
  - said at least two measured radiation intensities and
  - at least two reference radiation intensity and at least two reference emissivity, at different wavelength, of a reference steel strip having a known temperature for at least N oxide layer thickness from 0 to 200 nm,
- Estimating the emissivity coefficient of said heated steel strip, $\varepsilon_{ESTIMATED}$, using at least one of said measured radiation intensities and the estimated temperature, $T_{ESTIMATED}$, and
- Estimating the oxide thickness, $Ox_{ESTIMATED}$, of said heated steel strip using said estimated emissivity, $\varepsilon_{ESTIMATED}$.

Methods of thermal treatment are also provided.

BRIEF DESCRIPTION OF THE DRAWING

Other characteristics and advantages of the invention will become apparent from the following detailed description of the invention.

To illustrate the invention, various embodiment and trials of non-limiting example will be described, particularly with reference to the following figures:

FIG. 2 illustrates the steps of an embodiment of the present invention.

The invention relates to a method for estimating the oxide thickness and the temperature of a heated steel strip, undergoing a heat treatment performed at a temperature from 100° C to 1100° C, comprising the steps of:

1) Measuring at least two radiation intensities at different wavelengths, in a range from 1 to 5 μm, emitted by said heated steel strip,
2) Estimating the temperature of said heated steel strip, $T_{ESTIMATED}$, based on
   said at least two measured radiation intensities and
   a reference radiation intensity for at least a reference wavelength, emitted by a reference steel strip having a determined oxide layer thickness,
3) Estimating the emissivity coefficient of said heated steel strip, $\varepsilon_{ESTIMATED}$, using at least one of said measured radiation intensities and the estimated temperature, $T_{ESTIMATED}$,
4) Estimating the oxide thickness, $Ox_{ESTIMATED}$, of said heated steel strip using said estimated emissivity, $\varepsilon_{ESTIMATED}$.

The heat treatment performed at a temperature from 100° C to 1100° C can be an annealing treatment comprising a heating step and a soaking step. Moreover, after said heat treatment, the steel strip can be cooled and coated.

Figure 1:
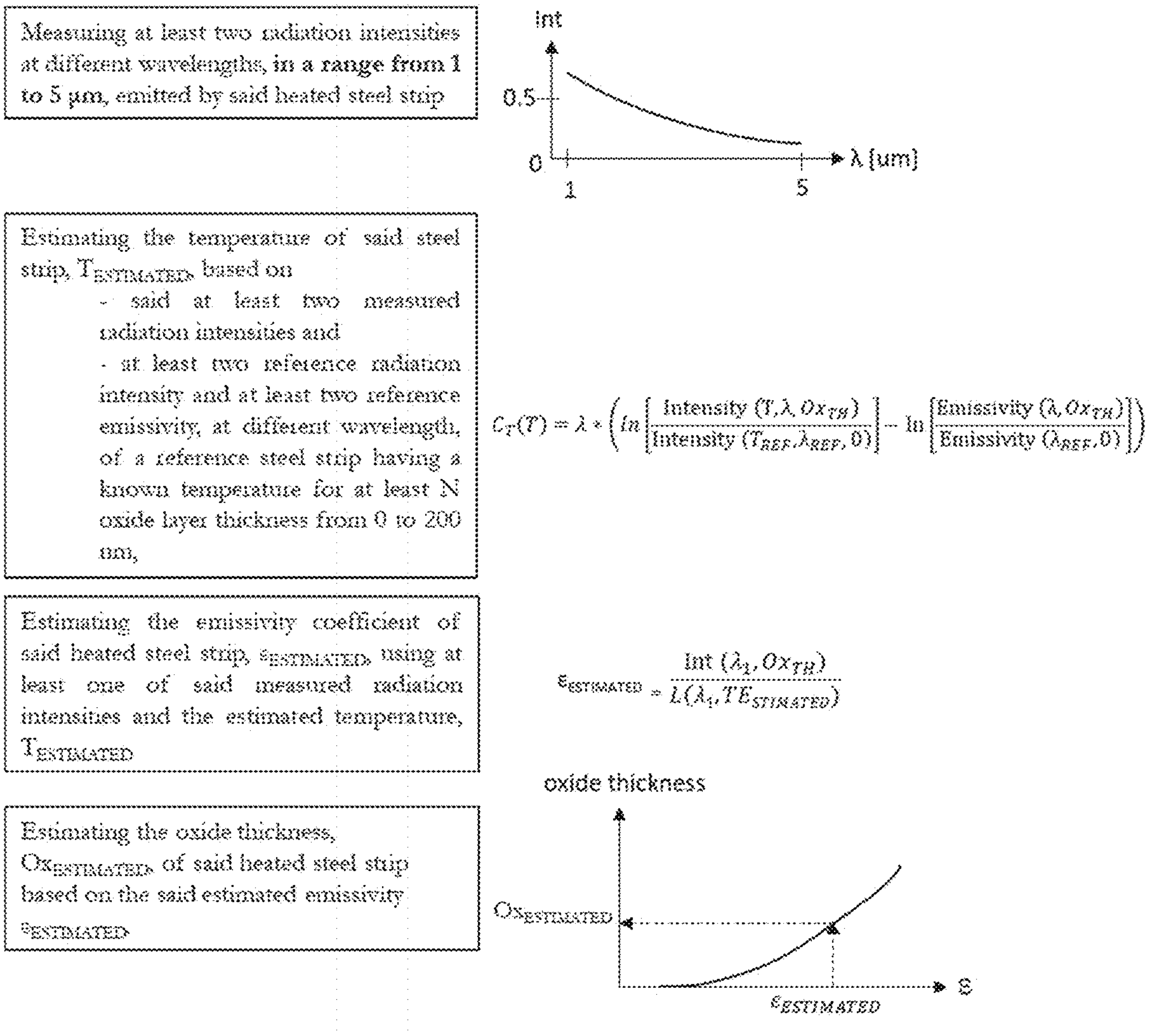
FIG. 1 exhibits process flow diagrams of a measuring method as known in the prior art and as claimed in the present invention.

The steps of the claimed method are illustrated in FIG. 1.

In the first step of the process, the intensity of at least two radiation, emitted by the heated steel strip, at different wavelengths of the 1-5 μm domain, are measured by any suitable measuring means. For example, a first radiation intensity at a wavelength of 2 μm is measured and a second radiation intensity at a wavelength of 4 μm is measured. The measuring means can be two spectrometers or a hyperspectral camera. This first step is represented, in FIG. 1, by a plot representing the radiation intensity in function of the wavelength which can be produced by said suitable measuring means.

The wavelength, of the measure intensity, is preferably not more than 5 μm because the 5-8 μm range lies in the absorption domain of air and also because greater is the wavelength, greater is the estimation error on the temperature difference as it can be deduced from the following equation:

$$\Delta T = \frac{\Delta\varepsilon}{\varepsilon} \times \lambda \times \frac{T_K^2}{14388}.$$

The radiation intensity of each wavelength detected by the recording means depends mainly on two factors: the radiance and the emissivity of the heated steel strip. In the following terms, λ refers to a wavelength, T refers to a temperature of the steel strip and $Ox_{TH}$ refers to the thickness of the oxide layer.

A steel strip radiance, Radiance (λ, T), depends only on the steel strip temperature and the measured wavelength as explained by the Planck Law.

The steel strip emissivity of a steel grade, Emissivity (λ, $Ox_{TH}$), depends on the oxide layer thickness and the wavelength. Consequently, the recorded intensity can be defined by the Equation (1):

$$\text{Intensity}(T,\lambda,Ox_{TH})=\text{Emissivity}(\lambda,Ox_{TH})*\text{Radiance}(\lambda,T) \quad (1)$$

In the second step, the goal is to estimate precisely the temperature of the heated steel strip using said measured at least two radiation intensities and at least two reference radiation intensity at different wavelength, emitted by a reference steel strip having a known temperature for at least N oxide layer thickness from 0 to 200 nm. Said N oxide layer thickness is noted as $Ox_{TH}n$.

N is an integer. Preferably, N is greater than 10. Even more preferably, N is greater than 25. Preferably, the step between each reference oxide layer thickness is of 5 nm.

One way to achieve that will be presented hereunder. The terms of the Equation (1) can be divided by the radiation intensity of a reference steel strip leading to Equation (2).

$$\frac{\text{Intensity }(T,\lambda,Ox_{TH})}{\text{Intensity }(T_{REF},\lambda_{REF},Ox_{TH}n)} = \frac{\text{Emissivity }(\lambda,Ox_{TH})\times\text{Radiance }(\lambda,T)}{\text{Emissivity }(\lambda_{REF},Ox_{TH}n)\times\text{Radiance }(\lambda_{REF},T_{REF})} \quad (2)$$

From the Equation (2) can be easily deduced the Equation (3).

$$\ln\left[\frac{\text{Intensity }(T,\lambda,Ox_{TH})}{\text{Intensity }(T_{REF},\lambda_{REF},OX_{TH}n)}\right] = \ln\left[\frac{\text{Emissivity }(\lambda,Ox_{TH})}{\text{Emissivity }(\lambda_{REF},Ox_{TH}n)}\right] + \ln\left[\frac{\text{Radiance }(\lambda,T)}{\text{Radiance }(\lambda_{REF},T_{REF})}\right] \quad (3)$$

The term, ln $$\left[\frac{\text{Radiance }(\lambda,T)}{\text{Radiance }(\lambda_{REF},T_{REF})}\right],$$

is equal to $$\frac{C_2}{\lambda(T_{REF})}\cdot\frac{T-T_{REF}}{T}$$

which is rewritten as $$\frac{C_T(T)}{\lambda}$$

wherein $C_T$(T) is equal to $$\frac{C_2\times(T-T_{REF})}{T_{REF}\times T}$$

wherein T is the temperature of the heated steel strip, $T_{REF}$ is the temperature of the reference steel strip and $C_2$ is a constant from the Planck's formula and equals to $$\frac{hc}{k},$$

wherein n is the Planck's constant and k is the Boltzmann constant.

A linearized emissivity being equal to:

$$\lambda \times \ln\left[\frac{\text{Emissivity }(\lambda, Ox_N)}{\text{Emissivity }(\lambda_{REF}, Ox_{TH}n)}\right],$$

can be defined. By combining said linearized emissivity and said at least two reference emissivity at different wavelength of a reference steel strip having a known temperature for at least N oxide layer thickness from 0 to 200 nm, it is possible to approximate the linearized emissivity with an affine function.

For example, said affine function can have a slope "a" and a y-intercept "b" wherein 'a' and 'b' are approximated using a polynomial function. For example, $'a' = a_1 \times Ox_N^2 + a_2 \times Ox_N + a3$, and $'b' = b_1 \times Ox_N^2 + b_2 \times Ox_N + b_3$.

In an analogue manner, a linearized intensity can be defined as being equal to:

$$\lambda \times \ln\left[\frac{\text{Intensity }(T, \lambda, Ox_{TH})}{\text{Intensity }(T_{REF}, \lambda_{REF}, Ox_{TH}n)}\right].$$

By combining said linearized intensity and said at least two reference radiation intensity at different wavelength, emitted by a reference steel strip having a known temperature for said at least N oxide layer thickness from 0 to 200 nm, it is possible to approximate the linearized intensity with an affine function.

For example, said affine function can have a slope "a" and a y-intercept "b". 'a' and 'b' can be approximated using a polynomial function.

For example, $'a' = a_1 \times Ox_N^2 + a_2 \times Ox_N + a3$, and $b = b_1 \times Ox_N^2 + b_2 \times Ox_N + b_3 + C_T(I)$.

By combining the equation 3 with the linearized intensity and emissivity, the following equation can be established:

$$C_T(T) = \lambda * \left(\ln\left[\frac{\text{Intensity }(T, \lambda, Ox_{TH})}{\text{Intensity }(T_{REF}, \lambda_{REF}, 0)}\right] - \ln\left[\frac{\text{Emissivity }(\lambda, Ox_{TH})}{\text{Emissivity }(\lambda_{REF}, 0)}\right]\right) \quad (4)$$

Then $C_T(T)$ can be found be resolving the equations systems. Solving the equation systems leads to two pairs of a value of oxide thickness associated with a $C_T(T)$, i.e. the temperature of the heated steel. The skilled in the art can easily rule out the pair presenting an incoherent value, by setting acceptable domain for the values. For examples, oxide thickness value being negative or exceeding a threshold value (such as 500 nm) or a steel temperature higher than the steel melting temperature can be considered as not possible.

It permits to find the estimated temperature of the heated steel sheet, $T_{ESTIMATED}$.

The greater the number of measured radiation intensity and of reference radiation intensity and of reference emissivity, the more accurate the coefficients of the polynome are and thus the greater the accuracy of the estimated temperature.

Preferably, the reference steel strip and the heated steel strip have a similar composition or belong to the same steel grade. Even more preferably, said reference steel strip has the same composition as the heated steel strip.

As known, based on the Planck's Law, the emissivity of a body can be calculated when its temperature is known. Consequently, in the third step, the emissivity of the heated steel strip can be estimated using the Planck's Law and the estimated temperature, $T_{ESTIMATED}$. For example, the Equation (5) wherein L is the luminance of the Plank's law can be used to estimate the emissivity. This is illustrated in FIG. 1. The estimated emissivity is noted $\varepsilon_{ESTIMATED}$.

$$\varepsilon_{ESTIMATED}(T_{ESTIMATED}, \lambda_1, Ox_{TH}) = \frac{\text{Intensity }(T_{ESTIMATED}, \lambda_1, Ox_{TH})}{L(T_{ESTIMATED}, \lambda_1)} \quad (5)$$

More than one emissivity of the heated steel strip can be estimated by using more than one of the at least two measured radiation intensities.

In the fourth step, the iron oxide thickness can be estimated using abacus wherein the iron oxide thickness is plotted in function of the emissivity of a steel strip for a determined wavelength. Such a curve is plotted in FIG. 1, wherein the oxide layer thickness is plotted in function of the emissivity of the FeO oxide for a determined wavelength.

More than oxide thickness of the heated steel strip can be estimated by using more than one of the estimated emissivity.

Figure 3:
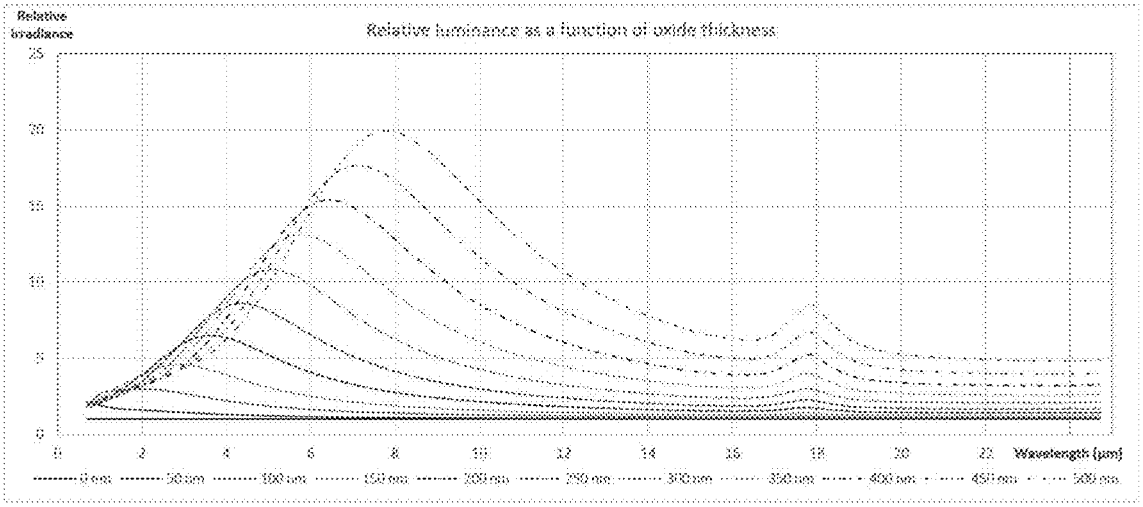
FIG. 3 is a plot representing a relative luminance in function of the wavelength for steel strip having various oxide layer thickness.

In the present invention, the temperature of the steel strip is estimated using measurements and reference values. On the contrary, in the prior art, the temperature was estimated using forecasted process temperature or two radiance temperature, as illustrated in FIG. 2. Moreover, the assumption that the emissivity is independent of the scale thickness for a wavelength between 12 and 20 μm is not correct as illustrated in FIG. 3 wherein the relative luminance is plotted in function of the wavelength for oxide thicknesses from 0 to 500 nm.

Thus, the estimated temperature of the present invention is more precisely and reliably determined because it takes into account the surface state (e.g. true emissivity) of the heated steel strip. Consequently, it also permits to improve the estimation of the oxide layer thickness.

Preferably, said heated steel strip is running.

Preferably, in step 1), at least ten radiation intensities, emitted by said heated steel strip, at different wavelengths of the 1-5 μm domain, are measured and in step 2), $T_{ESTIMATED}$ is estimated using said at least ten radiation intensities. Even more preferably, in step 1), at least twenty radiation intensities, emitted by the steel strip, at different wavelengths of the 1-5 μm domain, are measured. and in step 2), $T_{ESTIMATED}$ is estimated using said at least twenty radiation intensities. The more radiation intensities are used, the more reliable are the estimations.

Preferably, the at least two radiation intensities have a wavelength difference of at least 0.1 μm, more preferably of at least 0.5 μm and even more preferably of at least 1 μm. Apparently, greater is the wavelength difference, the more precise will be the temperature estimation.

Preferably, the heated steel strip and the reference steel strip have similar composition. Preferably, the composition of the heated steel strip and the reference steel have for each element, a mass proportion difference of maximum 10%, more preferably of maximum 5% and even more preferably of maximum 2%. For example, for a mass proportion difference of maximum 10%, if the heated steel strip comprises 5% of silicon, the reference steel strip comprises from 4.5% to 5.5% of silicon.

Preferably, the steel strip is set at a temperature from 500° C to 1100° C Such a temperature range permits to increase the radiance of the strip in the 1-5 μm range thus improving the measurement precision. Setting the steel strip temperature in this range is preferably done during an annealing process.

Even more preferably said heat treatment is performed at a temperature from 500° C to 1100° C, and in said step 1) the wavelength range of the measured at least two radiation intensities is from 1 to 1.7 μm. This wavelength domain is advantageous, for this temperature range, because a variation of the oxidised thickness layer impacts strongly the emissivity compared to other wavelength ranges of the 1 to 5 μm range. Secondly, this range exhibits the smallest impact of the measurement uncertainty of the estimated temperature on the estimated emissivity because within the 1 to 5 μm range.

Preferably, said heat treatment is performed at a temperature from 100° C to 500° C, and in said step 1) the wavelength range of the measured at least two radiation intensities is from 3 to 5 μm. Such a range is advantageous because the radiation intensity variation is, for this temperature range, greater in this domain than in the 1 to 3 μm range.

Preferably, said steps 1) to 4) are repeated for several points of said heated steel strip surface. Even more preferably, said steps 1) to 4) are done for several points along the heated steel strip width and along the heated steel strip length. Doing the steps 1) to 4) at several points of the heated steel strip surface permit to map the oxide layer thickness and the heated steel strip temperature at different locations of the heated steel strip. Advantageously, measurements are done close to the strip edges and close to the middle of the strip width.

Preferably, the method comprises a step of mapping the oxide thickness and the temperature of said steel strip using the estimated oxide thicknesses and estimated temperatures of said several points of the steel strip surface.

The invention also relates to a method of a thermal treatment of a heated steel strip performed in a furnace, wherein the previously described method is performed and said $T_{ESTIMATED}$ is used to control the furnace temperature.

Preferably, said furnace comprises a heating section and a soaking section the previously described method is performed in said heating section and said $T_{ESTIMATED}$ is used to control said furnace temperature during said heating step.

During the heating and the soaking steps, target temperatures for the heated steel strip are set in order to achieve the desired properties. Thanks to the previously explained method, the heated steel strip temperature can be monitored more precisely and reliably. Consequently, the furnace temperature and the heat quantity brought to the heated steel sheet can be varied to match the $T_{ESTIMATED}$ with the target temperature.

The invention also relates to a method of thermal treatment of a steel strip, comprising a heating step and a soaking step, being performed in a furnace comprising burners with adjustable power along the width of said heated steel strip, wherein the previously explained method is performed during said heating step and said estimated oxide thickness, $Ox_{ESTIMATED}$, is used to vary the power of said burners along said heated steel strip and to homogenize the oxide thickness along the width of said heated steel strip width.

Because several oxide thicknesses are estimated along the strip width, the oxide thickness variation along the strip width can be estimated. Then, the intensity of the burners can be varied in order to homogenize the oxide thickness along said heated steel strip width.

EXPERIMENTAL RESULTS

A comparative experiment has been conducted to evaluate the reliability of the claimed method. In this experiment, the temperature of the heated steel strip has been measured by three different techniques: pyrometers, wedge measure and the method according to the present invention. The results are plotted in FIG. 4.

It is known that the wedge measure is highly reliable for stable conditions, when the temperature is more or less constant, but is not reliable for unstable condition, when the temperature of the steel strip varies.

Figure 4:
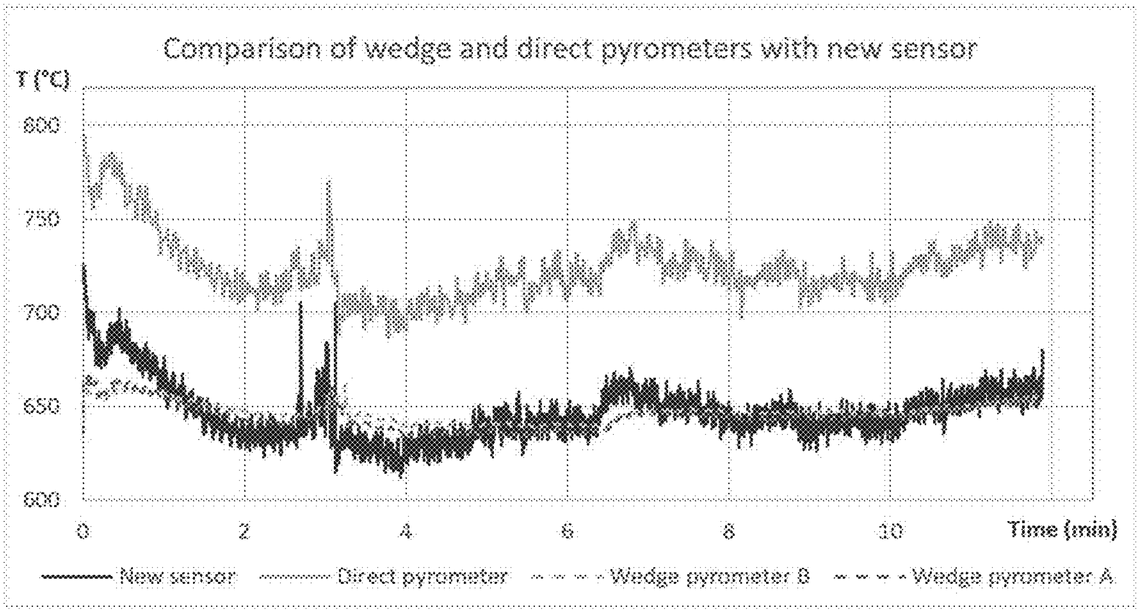
FIG. 4 exhibits two temperature measurements, one according to the prior art and the other according to a method of the present invention.

It can clearly be seen in FIG. 4, where the temperature is stable for circa 12 minutes, that the estimated temperature with the claimed method is closer to the temperature measured by the wedge measure than the temperature measured by pyrometers.

Consequently, the claimed method provides a more accurate method.

What is claimed is:

1. A method of thermally treating a steel strip, comprising:
- providing a furnace comprising burners with adjustable power along the width of a steel strip passing through the furnace;
- heating the steel strip by passing the steel strip through the furnace at a furnace temperature from 100° C to 1100° C;
- measuring at least two radiation intensities emitted from the heated steel strip in the furnace at different wavelengths, in a range from 1 to 5 μm;
- estimating the temperature of the heated steel strip, $T_{ESTIMATED}$, based on
  - the at least two measured radiation intensities and
  - at least two reference radiation intensities and at least two reference emissivities, at different wavelengths, of a reference steel strip having a known temperature for at least N oxide layer thickness from 0 to 200 nm;
- estimating the emissivity coefficient of the heated steel strip, $\varepsilon_{ESTIMATED}$, using at least one of the measured radiation intensities and the estimated temperature, $T_{ESTIMATED}$; and
- estimating the oxide thickness, $Ox_{ESTIMATED}$, of said heated steel strip using said estimated emissivity, $\varepsilon_{ESTIMATED}$;
- controlling the power of the burners along said heated steel strip based on $Ox_{ESTIMATED}$, thereby homogenizing the oxide thickness along the width of the heated steel strip.

2. The method as recited in claim 1 wherein the heated steel strip is running.

3. The method as recited in claim 1 wherein in the measuring step, at least ten radiation intensities, emitted by said heated steel strip, at different wavelengths of the 1-5 μm domain, are measured and in the estimating the temperature step, $T_{ESTIMATED}$ is estimated using said at least ten radiation intensities.

4. The method as recited in claim 3 wherein in the measuring step, at least twenty radiation intensities, emitted by the steel strip, at different wavelengths of the 1-5 μm domain, are measured, and in the estimating the temperature step, $T_{ESTIMATED}$ is estimated using said at least twenty radiation intensities.

5. The method as recited in claim 1 wherein the at least two radiation intensities are measured at a wavelength difference of at least 0.1 μm.

6. The method as recited in claim 5 wherein the at least two radiation intensities are measured at a wavelength difference of at least 0.5 μm.

7. The method as recited in claim 5 wherein the at least two radiation intensities are measured at a wavelength difference of at least 1 μm.

8. The method as recited in claim 1 wherein the heat treatment is performed at a temperature from 500° C to 1100° C, and in the measuring step the wavelength range of the measured at least two radiation intensities is from 1 to 1.7 μm.

9. The method as recited in claim 1 wherein the heat treatment is performed at a temperature from 100° C to 500° C, and in the measuring step the wavelength range of the measured at least two radiation intensities is from 3 to 5 μm.

10. The method as recited in claim 1 wherein the measuring and estimating the temperature, the emissivity coefficient and the oxide thickness steps are repeated for several points of the heated steel strip surface.

11. A method of thermal treatment of a heated steel strip being performed in a furnace, comprising:

performing the method as recited in claim 1 and using $T_{ESTIMATED}$ to control a furnace temperature.

12. The method as recited in claim 11 wherein the furnace comprises a heating section and a soaking section and wherein the method as recited in claim 1 is performed in the heating section and the $T_{ESTIMATED}$ is used to control the furnace temperature during the heating step.

* * * * *